United States Patent [19]
Newcomer et al.

[11] Patent Number: 6,162,981
[45] Date of Patent: Dec. 19, 2000

[54] FINGER PLACEMENT SENSOR FOR STRINGED INSTRUMENTS

[75] Inventors: Jesse B. Newcomer; Robert J. Freedman, Jr., both of Alexandria, La.; Mark S. Newcomer, Sugar Hill, Ga.; Richard Williams, Kansas City, Kans.

[73] Assignee: Visual Strings, LLC, Alexandria, La.

[21] Appl. No.: 09/457,942

[22] Filed: Dec. 9, 1999

[51] Int. Cl.[7] .................................................. G09B 15/00
[52] U.S. Cl. ...................... 84/485 R; 84/600; 84/470 R; 84/477 R; 84/723
[58] Field of Search ...................... 84/7–8, 10, 454–455, 84/470 R, 477 R, 485 R, 600, 718, 723–726, 730–731, 743, DIG. 6, DIG. 24

[56] References Cited

U.S. PATENT DOCUMENTS

| | | | |
|---|---|---|---|
| 3,726,177 | 4/1973 | Kaplan | 84/470 R |
| 3,730,964 | 5/1973 | Kaplan | 84/470 R |
| 3,823,637 | 7/1974 | Scott | 84/470 R |
| 4,966,052 | 10/1990 | Shiraki et al. | 84/723 |
| 5,040,447 | 8/1991 | Murata et al. | 84/723 |
| 5,286,911 | 2/1994 | Murata et al. | 84/723 |
| 5,585,583 | 12/1996 | Owen | 84/470 R |
| 6,018,118 | 1/2000 | Smith et al. | 84/600 |
| 6,066,791 | 5/2000 | Renard et al. | 84/477 R |

*Primary Examiner*—Robert E. Nappi
*Assistant Examiner*—Marlon T. Fletcher
*Attorney, Agent, or Firm*—Senniger, Powers, Leavitt & Roedel

[57] ABSTRACT

Apparatus providing instructional assistance to a student playing a stringed musical instrument. The apparatus instructs the student of proper finger placement on the instrument's strings and includes a finger placement sensor for identifying which strings are in contact with a fingerboard and the locations at which such strings are in contact with the fingerboard relative to the length of the fingerboard. The finger placement sensor generates electrical position signals representative of the identified strings and locations. A signal processing circuit electrically connected to the finger placement sensor receives and processes the position signals. The apparatus also includes an indicator electrically connected to the signal processing circuit for receiving the processed position signals and providing an indication to the student of which strings are in contact with the fingerboard and the location at which such strings are in contact with the fingerboard relative to the length of the fingerboard. A method of instructing a student in playing a stringed musical instrument includes displaying a graphical representation of the fingerboard and strings and outputting an audio representation to the student based on the position signals.

19 Claims, 4 Drawing Sheets

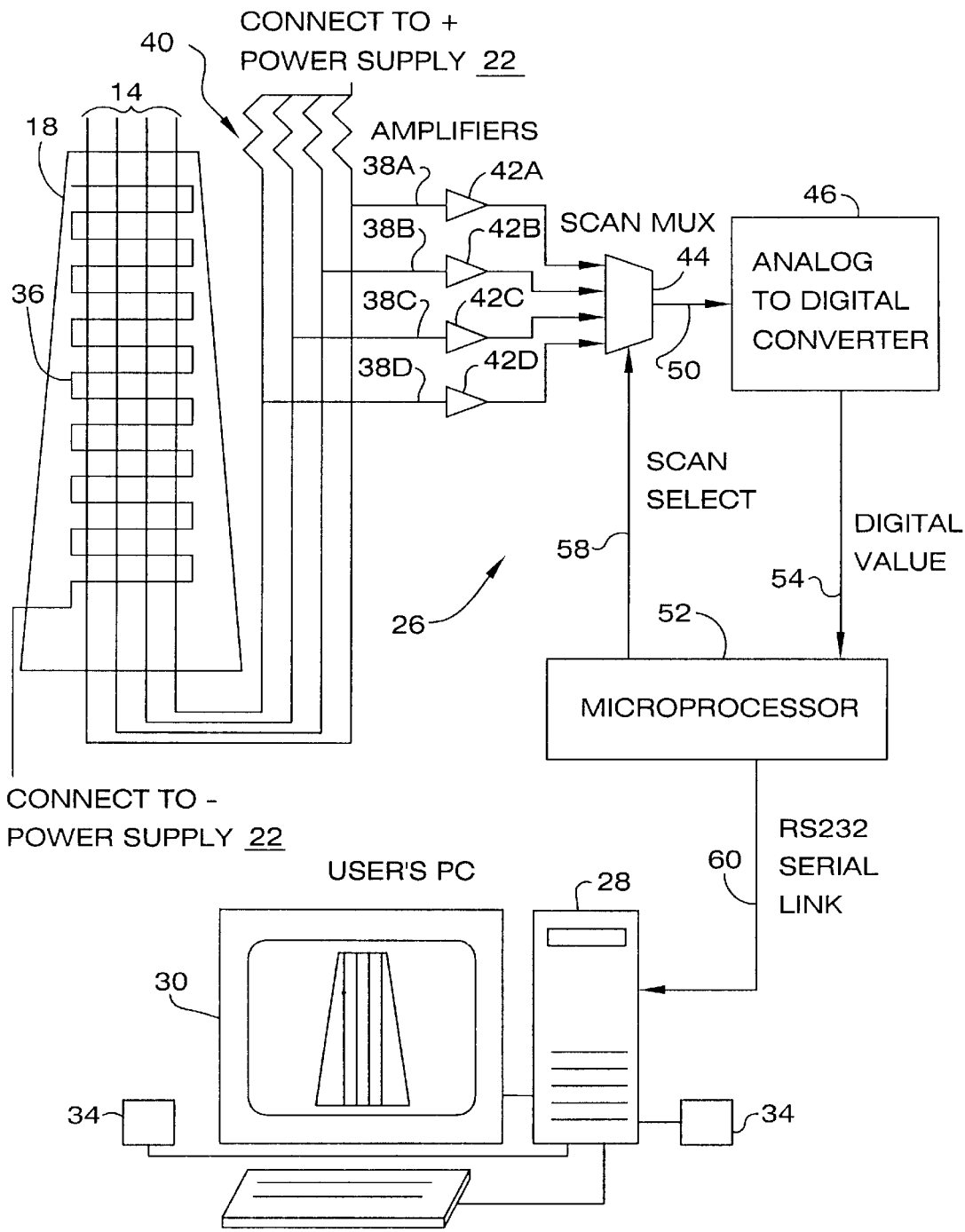

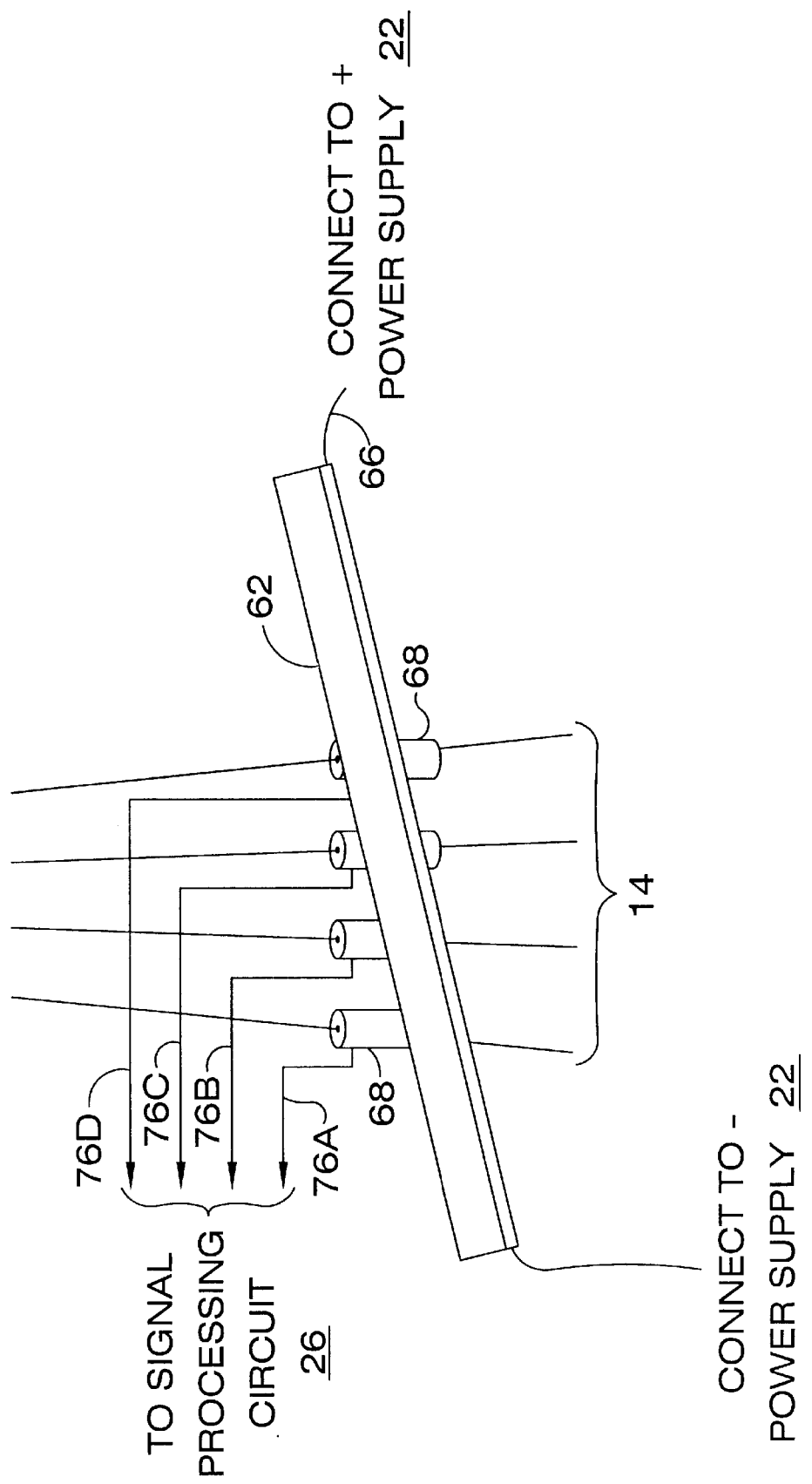

6,162,981

FINGER PLACEMENT SENSOR FOR STRINGED INSTRUMENTS

BACKGROUND OF THE INVENTION

The invention relates generally to a finger placement sensor for stringed instruments and, particularly, to a method and apparatus for use in training a student of the proper finger placement on the strings of a stringed instrument and for use in training the student how the instrument should sound when tuned and when proper finger placement is practiced.

Those familiar with musical instruments recognize the substantial time and effort that a student must commit in learning to play a stringed instrument. The student typically practices for many hours in addition to receiving instruction through music classes and private lessons. Although many believe regular private lessons are essential, they are often too expensive for a significant number of music students. Moreover, in many areas there are too few qualified music teachers to meet the demand even if the student can afford the lessons.

Since the physiological principle of muscle memory is such a critical issue in the development of stringed instrument playing, it is particularly important for the student to use proper finger placement when practicing alone. Otherwise, the student will likely develop a poor finger placement technique, which will slow his or her progress. Unfortunately, skilled instructors are often needed to provide students with the feedback necessary to teach proper finger placement technique. Since such instructors are often unavailable, a relatively inexpensive instructional tool is needed to teach proper finger placement on the strings of a stringed instrument. Such an instructional tool is needed for effectively teaching a student to play the stringed instrument when regular private lessons are too expensive, too inconvenient or otherwise unavailable.

Likewise, it is important for the student to practice with a properly tuned instrument. An improperly tuned instrument makes it difficult for the student to recognize the various notes by sound when using the proper finger placement. For these reasons, practice alone is generally insufficient for learning to play a stringed instrument with proper technique. Unfortunately, manually tuning a stringed instrument can be tedious and time-consuming and many students will either forego tuning the instrument or reduce their practice time, particularly when the student only has a limited amount of time available for practicing. Due to the youth and/or inexperience of the student or the student's parents or guardians, manually tuning the instrument may be further complicated by the student breaking one or more of the strings during tuning and by the student having difficulty in recognizing the correct pitch. Accordingly, an instructional tool is needed to teach the student how the stringed instrument should sound when properly tuned and when proper finger placement is used. Moreover, there is a need for a relatively inexpensive instructional tool that eliminates the need for the student to tune the stringed instrument prior to practicing.

In addition, a diagnostic tool is desired for identifying various qualities of a student's playing technique and diagnosing problems with it. For example, many songs require the student to use special playing techniques such as vibrato or pizzacato to achieve a desired effect. When playing a vibrato, for example, the student creates a vibrating sound by shaking his or her hand or wrist. This causes the finger contacting the string to roll and, thus, alternately raise and lower the pitch. The range of pitches and the speed of the vibrato are important characteristics for achieving the desired effect. Conventional instructional devices, however, are unable to diagnose and demonstrate a student's playing technique. Therefore, a diagnostic tool is desired for instructing a student regarding the speed of a vibrato, its range of pitches and the like.

Some people, especially children, may resist learning how to play a stringed instrument because the process seems more like work than entertainment. Thus, there is a further need for an instructional tool that provides instruction in the form of a game or other such activity that appeals to the student while still assisting the student in learning to play the stringed instrument and learning to play it correctly.

SUMMARY OF THE INVENTION

The invention meets the above needs and overcomes the deficiencies of the prior art by providing improved stringed instrument instruction. Among the several objects and features of the present invention may be noted the provision of an apparatus and method for instructing a student in proper finger placement on the strings of a stringed instrument; the provision of such apparatus and method that are relatively inexpensive; the provision of such apparatus and method that are both educational and entertaining; the provision of such apparatus and method for teaching a student how a stringed instrument should sound when properly tuned and when proper finger placement is used; the provision of such apparatus and method that may be used at a convenient time and location; the provision of such apparatus and method that eliminate the need to tune the stringed instrument prior to practicing; the provision of such apparatus and method that performs diagnostic functions; the provision of such apparatus and method for use with a variety of stringed instruments, including violins, violas, cellos, basses and guitars; and the provision of such apparatus and method that are economically feasible and commercially practical.

Briefly described, an apparatus embodying aspects of the invention provides instructional assistance to a student playing a stringed musical instrument. The instrument has a plurality of strings positioned above a fingerboard and extending the length of the fingerboard that the student presses when playing the instrument. The apparatus instructs the student of proper finger placement on the strings and includes a finger placement sensor for identifying which strings are in contact with the fingerboard and the locations at which such strings are in contact with the fingerboard relative to the length of the fingerboard. The finger placement sensor generates electrical position signals representative of the identified strings and locations. A signal processing circuit electrically connected to the finger placement sensor receives and processes the position signals. The apparatus also includes an indicator electrically connected to the signal processing circuit for receiving the processed position signals and providing an indication to the student of which strings are in contact with the fingerboard and the location at which such strings are in contact with the fingerboard relative to the length of the fingerboard.

In another embodiment of the invention, an apparatus provides instructional assistance to a student in playing a stringed musical instrument. The apparatus includes a fingerboard and a plurality of strings positioned above the fingerboard and extending its length. The strings and fingerboard are configured to simulate a stringed musical instrument and the strings are adapted to be pressed by the student against the fingerboard during operation of the apparatus. The apparatus also includes a finger placement sensor for identifying which strings are in contact with the fingerboard and the locations at which such strings are in contact with the fingerboard relative to the length of the fingerboard. The finger placement sensor generates electrical position signals representative of the identified strings and locations. A signal processing circuit electrically connected to the finger placement sensor receives and processes the position signals. The apparatus further includes an indicator electrically connected to the signal processing circuit for receiving the processed position signals and providing an indication to the student of which strings are in contact with the fingerboard and the location at which such strings are in contact with the fingerboard relative to the length of the fingerboard.

Yet another embodiment of the invention is directed to a method of instructing a student in playing a stringed musical instrument. The instrument has a plurality of strings positioned above a fingerboard and extending the length of the fingerboard that the student presses against the fingerboard when playing the instrument. The method instructs the student of proper finger placement on the strings by first identifying which strings are in contact with the fingerboard and the locations at which such strings are in contact with the fingerboard relative to the length of the fingerboard. The method also includes the steps of generating electrical position signals representative of the identified strings and locations, displaying a graphical representation of the fingerboard and strings based on the position signals and outputting an audio representation to the student based on the position signals. The graphical representation includes marks on one or more of the represented strings indicating to the student which strings are in contact with the fingerboard and the location at which such strings are in contact with the fingerboard. The audio representation includes a tone corresponding to the tone associated with the musical instrument when the strings contact the fingerboard at the identified locations.

Alternatively, the invention may comprise various other methods and systems.

Other objects and features will be in part apparent and in part pointed out hereinafter.

BRIEF DESCRIPTION OF THE DRAWINGS

FIG. 2 is a partially schematic representation of the apparatus of FIG. 1.

FIG. 3 is a partially schematic representation of a bowing sensor arrangement for use with the apparatus of FIG. 1.

Corresponding reference characters indicate corresponding parts throughout the drawings.

DETAILED DESCRIPTION OF PREFERRED EMBODIMENTS

Figure 1:
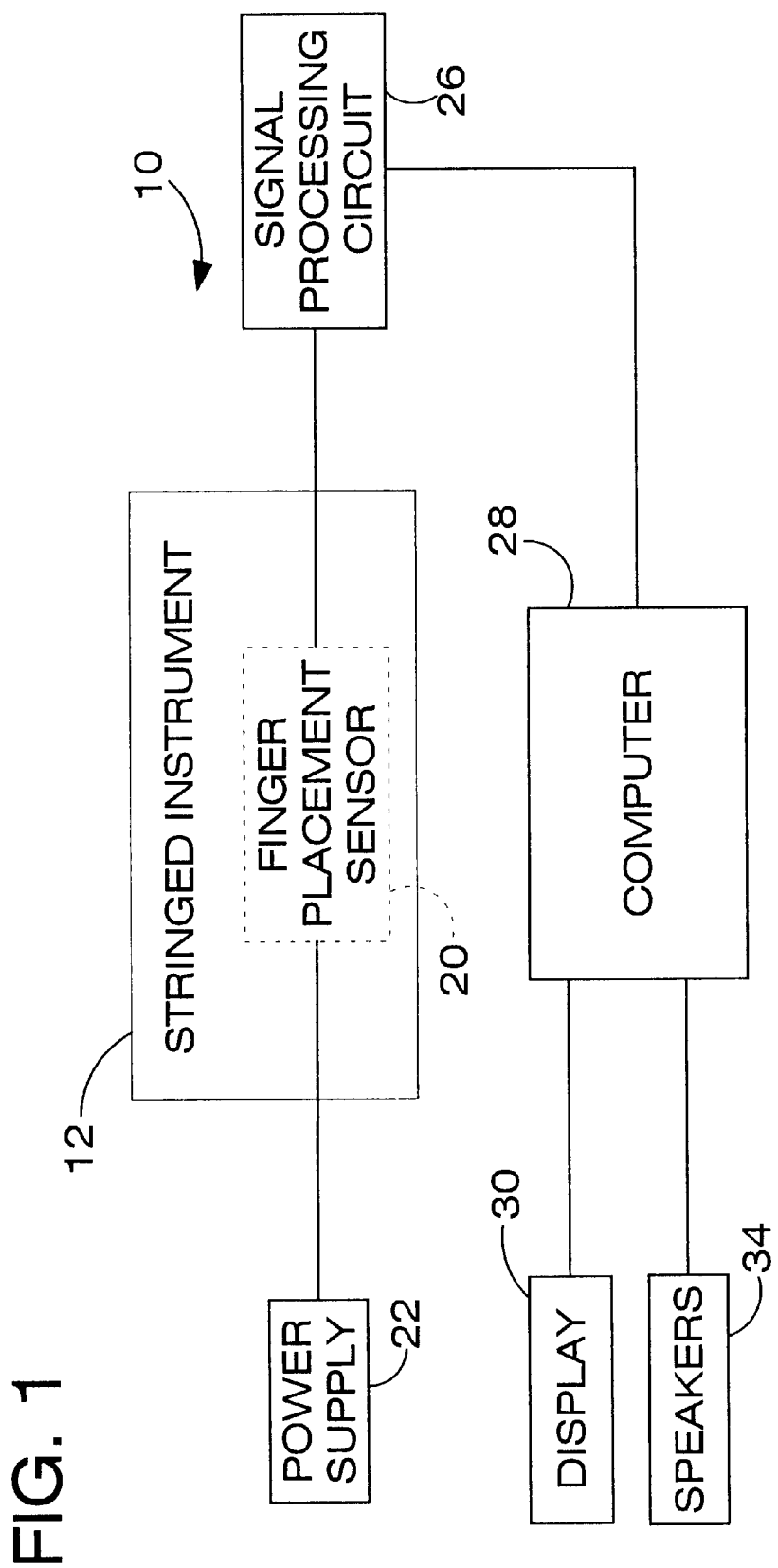
FIG. 1 is a block diagram of an instructional apparatus according to a preferred embodiment of the invention for use with a stringed instrument.

Referring now to the drawings, FIG. 1 illustrates aspects of the present invention in block diagram form. In FIG. 1, an instructional apparatus, generally indicated at 10, assists in training a student to play a stringed musical instrument 12, such as a violin, cello, viola, bass, guitar or the like. As is well known in the art, the stringed instrument 12 has a set of strings 14 (see FIG. 2) that produce sound when they vibrate. Depending on the particular type of instrument 12, the student vibrates the strings 14 by plucking, strumming or bowing them. By selectively pressing one or more of the strings 14 against a fingerboard 18 (see FIG. 2), the student alters the pitch and tone of the vibrating strings 14 for producing music. The apparatus 10 provides feedback to the student regarding his or her fingering technique, including feedback on the student's finger placement on strings 14.

Although described in connection with stringed instrument 12 for simplicity, it is to be understood that an electronic training apparatus embodying aspects of the invention can be constructed as a stand-alone unit rather than by retrofitting an existing stringed instrument with a modified fingerboard. In such an apparatus, strings 14 need not actually vibrate to produce sound since the sounds associated with particular fingering positions can be simulated.

In a preferred embodiment of the invention, apparatus 10 includes a finger placement sensor 20 associated with the fingerboard 18 of stringed instrument 12. A power supply 22 supplies electrical power to the finger placement sensor 20 enabling it to generate appropriate electrical position signals when the student presses one or more of the strings 14 against fingerboard 18. According to the invention, the position signals generated by sensor 20 identify which of strings 14 are in contact with fingerboard 18 and the location at which such strings 14 are in contact with fingerboard 18 relative to its length. A signal processing circuit 26 operably connected to finger placement sensor 20 processes the position signals and, in turn, a computer 28 provides a graphical user interface for displaying the processed position signals on a monitor, or display, 30. For example, the present invention includes an application compatible with Microsoft Windows® 95 for graphically displaying fingerboard 18 and strings 14 along with an indication of the finger placement on the strings. In addition, computer 28 preferably includes a sound card for use with speakers 34 for audibly signaling the note being played when the student places his or her fingers in the indicated position. For example, the speakers 34 are conventional stereo speakers or headphones adapted for use with a personal computer. Thus, computer 28, in combination with the monitor 30 and speakers 34, constitute an indicator for providing a visual and/or audio indication of the identified strings and finger locations.

The fingerboard 18 is attached to the neck (not shown) of instrument 12 and provides a variable endpoint for string vibrations. As shown in FIG. 2, fingerboard 18 does not include frets, which aid the student in placing his or her fingers at the correct position along strings 14. Although contemplated for use with various types of instruments, including those with frets on their fingerboards, the present invention is particularly useful with fingerboard 18, which does not have frets. This is due to the student's need for greater assistance in achieving proper finger placement when playing an instrument without frets on its fingerboard. For example, the fingerboard of a typical violin is made from a hard wood material (e.g., ebony) and does not have frets. According to the invention, fingerboard 18 replaces the standard fingerboard of instrument 12.

The finger placement sensor 20 senses the linear position of the student's fingers relative to one end of the neck of instrument 12. In general, finger placement sensor includes a resistive conductor 36 with one end that floats and the other connected to ground. The conductor 36 is preferably embedded in fingerboard 18 between fingerboard 18 and strings 14. In the illustrated embodiment, conductor 36 is embedded in fingerboard 18 in a generally serpentine configuration. In other words, conductor 36 forms a zig-zag, or back and forth, conductive path. Configuring conductor 36 in this manner increases the length of conductor 36 per unit of length in the longitudinal direction (i.e., the lengthwise direction of strings 14) and, thus, increases the linear voltage differential relative to the length of strings 14. In an alternative embodiment, the conductor 36 completely wraps or encircles fingerboard 18 to increase the length of conductor 36 relative to the length of fingerboard 18.

In a preferred embodiment, fingerboard 18 has a channel formed in a zig-zag, or back and forth, pattern with the conductor 36 inlaid into the channel. Finger placement sensor 20 also includes the strings 14 themselves, which are connected to the signal processing circuit 26 via lines 38a–38d. A NiChrome alloy wire, made from nickel and chrome, is a suitable conductor 36 because it has a higher electrical resistance per unit length (e.g., 2.5 Ω/inch) than many other types of metal. Thus, a variable voltage drop is established along a length of conductor 36 when it is energized by power supply 22 via strings 14. By laying conductor 36 out in the back and forth pattern shown in FIG. 2, or by wrapping fingerboard 18, the linear voltage differential relative to the length of strings 14 is increased.

The present invention uses metal strings 14 so that when one of the strings 14 is pressed against conductor 36, it completes a circuit having a resistance that is a function of the linear position of the contact. When electrical current supplied by power supply 22 energizes the NiChrome wire conductor 36 via one of the strings 14, a linear voltage gradient is created along the length of conductor 36. Since strings 14 are preferably made of small diameter steel, the resistance of each is negligible. In the illustrated embodiment, each of strings 14 is connected to a positive terminal of power supply 22 via a resistor, generally indicated at 40. The resistor 40 for each string 14, in combination with the resistance of conductor 36 (from the finger position on the respective string 14 to ground), forms a voltage divider relative to the respective line 38. Thus, the resistance of conductor 36 allows the sensing of position.

In a preferred embodiment, signal processing circuit 26 includes an operational amplifier 42 corresponding to each string 14. The lines 38a–38d connect each string 14 to an input of the corresponding op amp voltage amplifier 42a–42d. The output of each amplifier 42 runs into an analog multiplexer, or scan MUX, 44. Signal processing circuit 26 further includes an analog to digital converter, or ADC, 46 connected to the scan MUX 44 via line 50. In this instance, the ADC 46 provides a digital value representative of the multiplexed signals to a microprocessor 52 via line 54 for processing. Several microcontrollers in the M68HC11 family of 8-bit microcontrollers manufactured by Motorola are suitable for use as the microprocessor 52. Many of the HC11 microcontrollers include a built-in analog to digital converter for use as ADC 46.

Referring further to the signal processing circuit 26, the microprocessor 52 switches the analog scan MUX 44 with a scan select signal via line 58. Scan MUX 44 preferably switches thousands of times per second. On each switch, ADC 46 receives one of the four string signals. A signal present at the input to ADC 46 indicates that the student is pressing a particular one or more of the strings 14. This operation is similar to a keyboard scanning system. Once the multiplexed signal arrives at ADC 46 from scan MUX 44, ADC 46 feeds the converted digital signal to microprocessor 52. In turn, microprocessor 52 initiates several conversions and executes software to debounce and average the incoming signal. This ensures consistent conversions. When microprocessor 52 completes the conversion sequences, it transmits the position information (including a string number value and a distance value) to computer 28 via line 60. In a preferred embodiment, the line 60 is an RS-232 serial link having three wires and is input to the COM port of computer 28. A circuit (not shown), such as a Maxim Integrated Circuits Model No. MAX232 driver/receiver, translates the data for communications according to the RS-232 standard.

According to the invention, microprocessor 52 constructs packets of finger placement or bowing information for communication with computer 28. The computer 28 constitutes a processor for receiving these processed position signals from microprocessor 52 via line 60. Preferably, computer 28 provides a graphical user interface for displaying the processed position signals on monitor 30. For example, monitor 30 graphically displays fingerboard 18 and strings 14 along with marks on one or more of the strings 14 indicating the student's finger placement. In one embodiment, the display shows incorrect finger placements (i.e., those not identified as corresponding to known musical notes) as red dots and correct finger placements as green dots. A third color dot (e.g., yellow) may be used to indicate when they partially or completely overlap. Computer 28 also plays the note corresponding to the student's finger placement over speakers 34. It is further contemplated that the computer 28 can be programmed to display the music being played by the student on monitor 30. As such, the student need not look away from monitor 30 to a music stand, for example, while practicing. A multi-section screen display, such as a quad screen display, provides the student with multiple views. For example, a quad screen display may be used to display the music to be played, the student's actual fingering, the music's tempi and the game score (if a game is being played as a learning tool).

Those skilled in the art also recognize that computer 28 can be programmed to cooperate with a printer for printing a diagnostic report for use by the student. Such a report indicates, for example, the notes played correctly by the student as well as the notes played incorrectly by the student. Further, the use of a touch-screen, transducer/resistors and/or other materials is contemplated Since computer 28 generates the report and displays the student's performance on monitor 30, the invention is particularly well suited for presenting a qualified string teacher to a student or multiple students through the use of local or global presentations or lessons on the world wide web (i.e., via a global communications network such as the Internet) and communicating response information back to the teacher via the network. This helps overcome the obstacle when there are too few qualified teachers in the student's community. Moreover, this may involve private string lessons by single students or groups of students in public or private school settings. Therefore, string classes can take place in the computer room of a school with only the general monitoring of the class by a non-musician or a general music teacher rather than in the school's music room with a qualified and/or certified string teacher. This provides small schools and small school systems with an opportunity to have a string program.

Although described in connection with a violin, application of the present invention to other stringed instruments 12, including violas, cellos, guitars and basses, is contemplated and within the scope of the invention.

In an alternative embodiment, fingerboard 18 is constructed from polyester resin. Conductor 36 is laid out in the back and forth pattern in a fingerboard mold, which is then filled with a polyester resin. After the resin cures, a thin layer of the resin fingerboard 18 can be removed to reveal conductor 36. This can be done by lightly sanding the top of fingerboard 18. In this embodiment, the resin fingerboard 18 replaces the conventional fingerboard of instrument 12.

In yet another embodiment, conductor 36 is a conducting polymer. For example, E.I. du Pont de Nemours and Company sells polymer chemicals under the trademark Zypan™. These chemicals impart conductivity and/or anti-corrosive properties to chemicals, polymers, paints and electronic goods. In this embodiment, strings 14 are temporarily removed from instrument 12 and the conducting polymer forming conductor 36 is applied in the desired pattern on the instrument's existing fingerboard.

In operation, training apparatus 10 senses contact between one or more of the strings 14 and fingerboard 18 and generates position signals identifying which of the strings 14 are in contact with fingerboard 18 and the location of such contact. Training apparatus 10 further communicates the position signals to signal processing circuit 26 for processing the position signals and then communicates the processed position signals to computer 28 for indicating to the student which of the strings 14 are in contact with fingerboard 18 and the location of such contact.

Referring now to FIG. 3, the present invention assists the student in improving multiple areas of his or her playing technique. As described above, the strings 14 of stringed instrument 12 produce sound when they vibrate. The student can vibrate strings 14 by plucking, strumming or bowing them. In addition to proper finger placement, the student's technique in vibrating strings 14 is an important aspect for determining musical quality. With respect to bowing, FIG. 3 illustrates an added arrangement for providing feedback relating to the student's bowing technique. A bow 62 for use with stringed instrument 12 has a resistive conductor 66 stretched from end to end. For example, the bow 62 is a conventional bow modified to include the conductor 66. In a manner similar to conductor 36, power supply 22 energizes conductor 66, which is, for example, a NiChrome alloy wire. Since NiChrome alloy has a relatively high electrical resistance per unit length, energizing conductor 66 establishes a linear voltage differential along the length of conductor 66.

Figure 4:
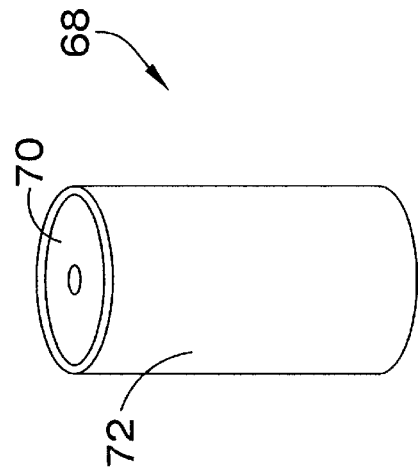
FIG. 4 is a perspective view of a bead of the bowing sensor of FIG. 3.

Each string 14 preferably has a conductive bead, or ferrule, 68 positioned on the string in the area of the instrument's bridge. FIG. 4 illustrates the bead 68 in greater detail. Each bead 68 has an inner cylindrical sleeve 70 made from an insulative material, such as plastic, that contacts the corresponding string 14. An outer cylindrical sleeve 72 made from a conductive metal (e.g., brass) covers the insulative material of the inner cylinder 70. Referring again to FIG. 3, when the student uses the bow 62, he or she will press conductor 66 against one or more of the beads 68. This will complete at least one circuit having a resistance that is a function of the linear position of the contact (relative to the length of bow 62). When electrical current supplied by power supply 22 energizes the NiChrome wire conductor 66, a linear voltage gradient is created along the length of conductor 66. Thus, the resistance of conductor 66 allows the sensing of position and also registers the fact that an open string is being played when the music calls for it and no fingers are at that moment being used to register a note.

As shown in FIG. 3, lines 76a–76d connect each bead 68 to signal processing circuit 26. It is to be understood that the circuitry of signal processing circuit 26 may be used for processing the bowing signals from beads 68 or that circuit 26 may include circuitry for processing the bowing signals that is essentially identical to the circuitry described above. In other words, the lines 76a–76d connect each bead 68 to an input of a corresponding op amp voltage amplifier (e.g., op amp 42). A multiplexer (e.g., scan MUX 44) multiplexes the four signals and, in turn, an analog to digital converter (e.g., ADC 46) generates a digital value representative of the multiplexed signals. The converter provides the digital value to a microprocessor (e.g., microprocessor 52) for processing.

Figure 5:
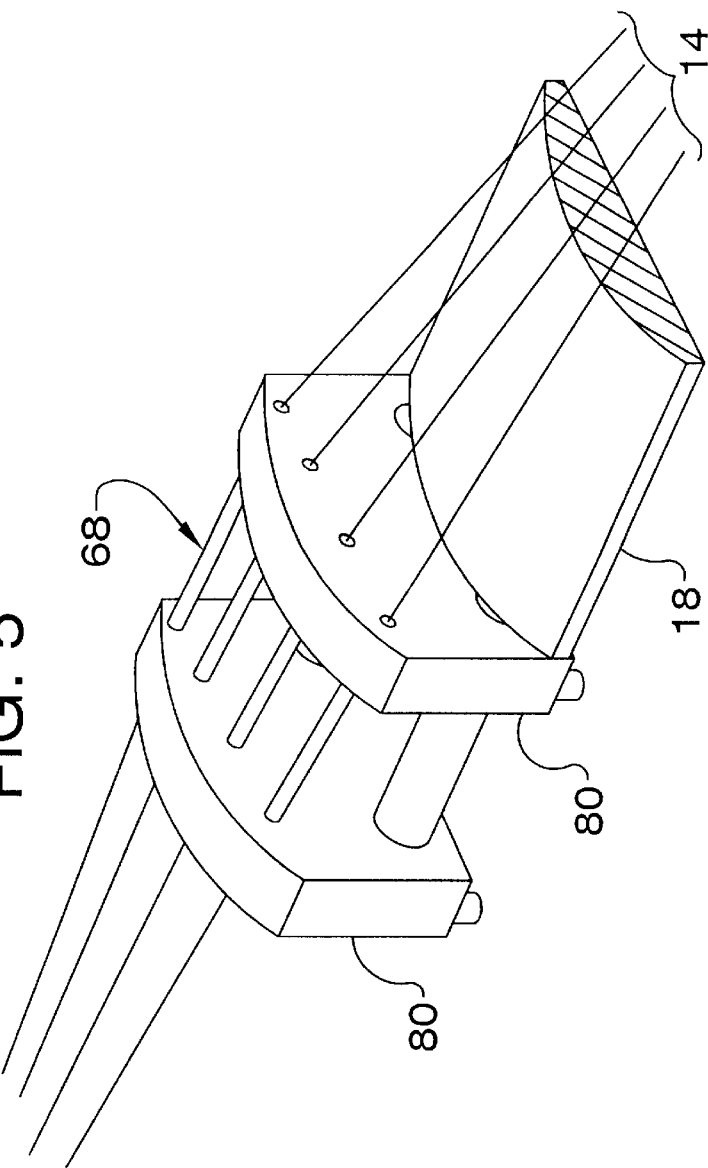
FIG. 5 is a fragmentary perspective view of generally parallel rails for use with the bowing sensor of FIG. 3.

Referring now to FIG. 5, the present invention includes generally parallel rails 80 on either side of beads 68. In this embodiment, strings 14 pass through one rail 80, through the beads 68 and then through the other rail 80. The rails 80 assist the student in positioning bow 62 generally perpendicular to strings 14 and maintaining its alignment during bowing.

As before, the microprocessor initiates several conversions and executes software to debounce and average the incoming digital signal. This ensures consistent conversions. When the microprocessor completes the conversion sequence, it transmits the position information (including a string number value and a distance value) to a computer (e.g., computer 28). The computer receives the processed position signals from the microprocessor and provides a graphical user interface for displaying the processed position signals on its display. The computer 28 also plays the note corresponding to the student's finger placement and bowing technique over its speakers 34.

It is contemplated that the present invention can provide diagnostic information regarding the student's use of pizzacato in addition to bowing. Those skilled in the art recognize pizzacato as the technique of plucking strings 14 instead of bowing them. In this embodiment, bow 62 is modified to include, for example, a tapping device on the bow frog to permit a simulated plucking action. A modified pick may be used on the student's index finger to achieve a plucking or strumming effect.

In addition, it is contemplated that the present invention may be suitably adapted for use by people with various physical limitations such as blindness, deafness, and the loss of an arm or and a hand or its use.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for providing instructional assistance to a student playing a stringed musical instrument, said instrument having a plurality of strings positioned above a fingerboard and extending the length of the fingerboard, said strings being adapted to be pressed by the student against the fingerboard during the playing of the instrument, said apparatus for use in instructing the student of proper finger placement on the strings, said apparatus comprising:

a finger placement sensor for identifying which strings are in contact with the fingerboard and the locations at which such strings are in contact with the fingerboard relative to the length of the fingerboard, said finger placement sensor generating electrical position signals representative of the identified strings and locations;

a signal processing circuit electrically connected to the finger placement sensor for receiving and processing the position signals; and an indicator electrically connected to the signal processing circuit for receiving the processed position signals and providing an indication to the student of which strings are in contact with the fingerboard and the location at which such strings are in contact with the fingerboard relative to the length of the fingerboard.

2. The apparatus of claim 1 wherein the finger placement sensor comprises a conductor positioned along the length of the fingerboard, said sensor conductor having a relatively high electrical resistance per unit length so that a linear voltage differential is established along the length of the sensor conductor when it is energized by a power source, and wherein the strings are made from a conductive material so that an electrical contact is formed between one or more of the strings and the sensor conductor when the student presses the respective strings against the fingerboard.

3. The apparatus of claim 2 wherein the conductor is a wire made from an alloy of nickel and chrome.

4. The apparatus of claim 2 wherein the conductor is embedded in a top surface of the fingerboard below the strings.

5. The apparatus of claim 2 wherein the conductor has a generally serpentine configuration.

6. The apparatus of claim 1 wherein the indicator comprises a processor receiving and responsive to the processed position signals from the signal processing circuit and a monitor associated with processor, said monitor providing the student with a visual indication of which strings are in contact with the fingerboard and the location at which such strings are in contact with the fingerboard based on the processed position signals received by the processor.

7. The apparatus of claim 6 wherein the monitor graphically displays a representation of the fingerboard and strings including marks on one or more of the represented strings indicating the location at which the strings are in contact with the fingerboard.

8. The apparatus of claim 1 wherein the indicator comprises a processor receiving and responsive to the processed position signals from the signal processing circuit and a speaker associated with processor, said speaker providing the student with an aural indication of which strings are in contact with the fingerboard and the location at which such strings are in contact with the fingerboard based on the processed position signals received by the processor.

9. The apparatus of claim 8 wherein the speaker outputs an audio representation of the musical tone corresponding to when the strings contact with the fingerboard at the identified locations.

10. The apparatus of claim 1 wherein the position signals generated by the finger placement sensor are analog signals and wherein the signal processing circuit comprises an analog to digital converter for converting the analog position signals into at least one digital position signal.

11. The apparatus of claim 10 wherein the signal processing circuit comprises an amplifier corresponding to each of the strings, said amplifiers receiving and amplifying the analog position signals.

12. The apparatus of claim 11 wherein the signal processing circuit comprises an analog multiplexer receiving and responsive to the amplified analog position signals for generating a multiplexed position signal and outputting the multiplexed position signal to the analog to digital converter.

13. The apparatus of claim 12 wherein the signal processing circuit comprises a microprocessor electrically connected to the multiplexer for performing a scanning operation and electrically connected to the analog to digital converter for receiving the digital position signal, said microprocessor being configured to switch the multiplexer, perform one or more conversions on the digital position signal and communicate the processed digital position signal to the indicator.

14. The apparatus of claim 11 wherein the strings are made from a conductive material and each string is electrically connected to an input of the corresponding one of the amplifiers.

15. The apparatus of claim 1 further comprising a bow for bowing the strings and a bowing sensor for identifying which strings are being bowed and the locations at which the bow is in contact with the strings relative to the length of the bow, said bowing sensor generating electrical position signals representative of the identified strings and locations.

16. The apparatus of claim 15 wherein the bowing sensor comprises a conductor positioned along the length of the bow, said bow conductor having a relatively high electrical resistance per unit length so that a linear voltage differential is established along the length of the bow conductor when it is energized by a power source, and further comprising a bead made from a conductive material on each of the strings whereby an electrical contact is formed between one or more of the beads and the bow conductor when the student is bowing the strings.

17. The apparatus of claim 16 wherein the bowing sensor comprises a pair of generally parallel rails for guiding the bow relative to the beads.

18. An apparatus for providing instructional assistance to a student in playing a stringed musical instrument, said apparatus comprising:

a fingerboard;

a plurality of strings positioned above the fingerboard and extending the length of the fingerboard, said strings and said fingerboard being configured to simulate a stringed musical instrument, said strings being adapted to be pressed by the student against the fingerboard during operation of the apparatus;

a finger placement sensor for identifying which strings are in contact with the fingerboard and the locations at which such strings are in contact with the fingerboard relative to the length of the fingerboard, said finger placement sensor generating electrical position signals representative of the identified strings and locations;

a signal processing circuit electrically connected to the finger placement sensor for receiving and processing the position signals; and an indicator electrically connected to the signal processing circuit for receiving the processed position signals and providing an indication to the student of which strings are in contact with the fingerboard and the location at which such strings arc in contact with the fingerboard relative to the length of the fingerboard.

19. A method of instructing a student in playing a stringed musical instrument, said instrument having a plurality of strings positioned above a fingerboard and extending the length of the fingerboard, said strings being adapted to be pressed by the student against the fingerboard during the playing of the instrument, said method for use in instructing the student of proper finger placement on the strings, said apparatus comprising:

identifying which strings are in contact with the fingerboard and the locations at which such strings are in contact with the fingerboard relative to the length of the fingerboard;

generating electrical position signals representative of the identified strings and locations;

displaying a graphical representation of the fingerboard and strings based on the position signals, said graphical representation including marks on one or more of the represented strings indicating to the student which strings are in contact with the fingerboard and the location at which such strings are in contact with the fingerboard; and outputting an audio representation to the student based on the position signals, said audio representation including a tone corresponding to the tone associated with the musical instrument when the strings contact the fingerboard at the identified locations.

* * * * *